G. W. BERT.
Bung and Tap Bushing.

No. 205,783.  Patented July 9, 1878.

WITNESSES:
Geo. A. Vaillant.
Harry O'Neill.

INVENTOR
Gustave W. Bert,
by J. Snowden Bell,
ATTORNEY

UNITED STATES PATENT OFFICE.

GUSTAVE W. BERT, OF PHILADELPHIA, PENNSYLVANIA, ASSIGNOR OF ONE-HALF HIS RIGHT TO WM. M. BOWER, OF SAME PLACE.

IMPROVEMENT IN BUNG AND TAP BUSHINGS.

Specification forming part of Letters Patent No. 205,783, dated July 9, 1878; application filed May 15, 1878.

*To all whom it may concern:*

Be it known that I, GUSTAVE W. BERT, of the city and county of Philadelphia, in the State of Pennsylvania, have invented certain new and useful Improvements in Bung and Tap Bushings, of which the following is a specification:

The object of my invention is to provide a simple and efficient bushing for fitting bungs or spigots into kegs, barrels, vats, or other vessels, in the use of which perfectly-tight joints shall be insured, and the insertion and removal of the bung or spigot be effected without damage to the head or stave in which it is placed; to which ends my improvements consist in the combination of a tapered or frusto-conical metallic sleeve or socket, having an external screw-thread and an internal lower flange or rim for the support of packing, a packing-sleeve, of rubber cloth or other suitable material, fitted within and compressed against the flange of the metallic socket, and a packing-screw, which engages with said socket and retains the packing in position, all as hereinafter more fully set forth.

Figure 1:
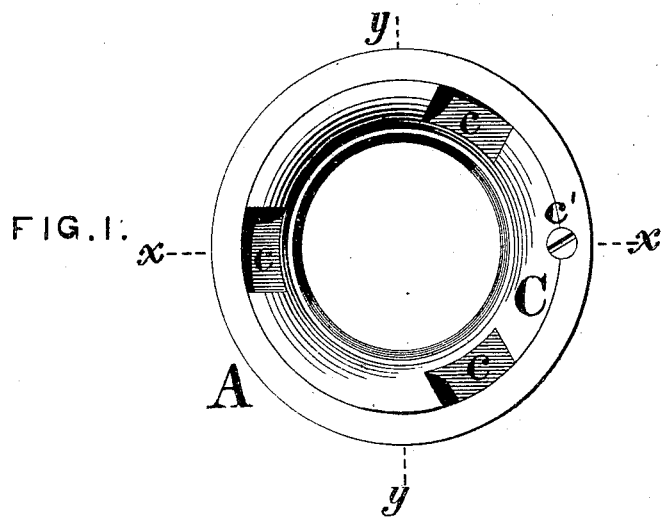
Figure 2:
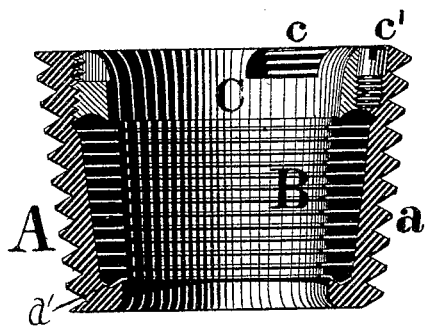
Figure 3:
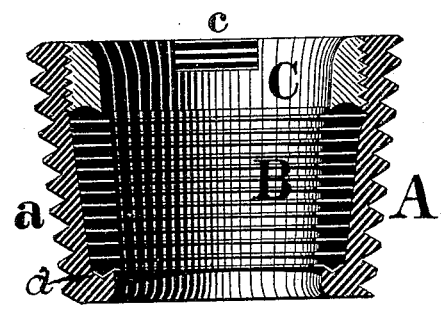

In the accompanying drawings, Figure 1 is a plan or top view of a bung and tap bushing embodying my improvements; and Figs. 2 and 3, transverse sections of the same at the lines $x$ $x$ and $y$ $y$, respectively, of Fig. 1.

To carry out my invention, I provide a metallic sleeve or socket, A, of tapered or frusto-conical form, and having an external screw-thread, $a$, formed upon it to fit a corresponding female thread in the head or stave into which the bushing is to be screwed, a perfectly-tight joint between the two being secured by the use of white lead or equivalent material. The sleeve A is provided at bottom with an internal rim or flange, $a'$, to serve as a support for a tapered sleeve, B, of elastic packing, which rests upon the flange $a'$, its smallest internal diameter being less than that of said flange, to prevent the bung or spigot from coming in contact with and wearing or injuring the same. The packing-sleeve B, which is, by preference, composed of a series of rings of rubber cloth, that being the material which I consider best adapted for the purpose, is tightly compressed within the metallic sleeve A under a pressure of, say, four thousand pounds, and is afterward turned out on its inner surface to a bevel corresponding substantially with that of the bung or spigot used.

A packing-screw, C, serves to retain the packing in position, said packing-screw consisting of a metal ring, having an external thread fitting a female thread formed in the upper portion of the sleeve A. The internal diameter of the packing-screw is less than the internal diameter at top of the packing-sleeve, in order that the inserted bung or spigot shall have no bearing upon it, and shall bear solely upon the packing-sleeve. When in position the packing-screw is flush at top with the sleeve A, so that when the bushing is inserted in the barrel and the bung driven into it a stamp may be conveniently pasted over its top. Two or more recesses, $c$, formed in the top of the packing-sleeve admit of the application of a wrench to screw it down tightly upon the packing, and when in position it is prevented from unscrewing and working loose by a locking-pin or screw, $c'$, fitting between it and the sleeve A. The upper surface of the flange $a'$ of said sleeve is inclined downward and outward, so as to form a dovetail or undercut recess; and the bottom of the packing-screw C is likewise made concave or recessed, as will be seen by reference to Figs. 2 and 3, so that the packing is firmly clamped between the flange and packing-screw without the possibility of accidental displacement.

In the use of my improvements it will be seen that the head or stave of the keg, barrel, or vat in which the bushing is inserted, being relieved from any contact with the bung or spigot, is entirely free from the wear and destructive action which ensue where the latter are driven directly into the wood, as is ordinarily the case; and, further, that as the bung and spigot bear only on the packing, there is no wear upon the bushing. Further, the elasticity of the packing enables tight joints to be made with bungs and spigots of different tapers, instead of necessitating an accurate correspondence of the same with a hole in the head or stave.

I am aware that bushings provided with internal packing to receive a faucet, said packing being held in position by a screw or otherwise, have been heretofore known, and do not, therefore, broadly claim such device.

I claim as my invention and desire to secure by Letters Patent—

1. The combination, in a bung and tap bushing, of a tapered metallic sleeve, having an external screw-thread to fit into the head or stave of a keg, barrel, or vat, and a series of packing-rings, of rubber cloth, fitted by compression within an internal recess in the sleeve, and retained in position by a packing-screw engaging an internal screw-thread thereon, substantially as set forth.

2. The combination, in a bung and tap bushing, of a tapered metallic sleeve, having an external screw-thread extending from its larger to or near its smaller end, and an internal recess, having a dovetailed or inclined bottom, a sleeve of compressed packing fitting within said recess and affording bearing for a bung and spigot clear of the outer sleeve, and a packing-screw which engages an internal thread on said outer sleeve above the packing, these members being arranged to provide a clear open space for the passage of the bung and spigot and a flush top for the bushing when inserted in a keg, substantially as set forth.

GUSTAVE W. BERT.

Witnesses:
  J. SNOWDEN BELL,
  GEO. A. VAILLANT.